United States Patent
Wang et al.

(10) Patent No.: US 12,205,343 B2
(45) Date of Patent: Jan. 21, 2025

(54) DETECTING OBJECTS NON-VISIBLE IN COLOR IMAGES

(71) Applicant: George Mason University, Fairfax, VA (US)

(72) Inventors: Yongxin Wang, Fairfax, VA (US); Duminda Wijesekera, McLean, VA (US)

(73) Assignee: George Mason University, Fairfax, VA (US)

( * ) Notice: Subject to any disclaimer, the term of this patent is extended or adjusted under 35 U.S.C. 154(b) by 559 days.

(21) Appl. No.: 17/537,671

(22) Filed: Nov. 30, 2021

(65) Prior Publication Data
US 2022/0172452 A1  Jun. 2, 2022

Related U.S. Application Data

(60) Provisional application No. 63/177,578, filed on Apr. 21, 2021, provisional application No. 63/119,196, filed on Nov. 30, 2020.

(51) Int. Cl.
*G06V 10/56* (2022.01)
*G06N 3/045* (2023.01)
(Continued)

(52) U.S. Cl.
CPC .............. *G06V 10/56* (2022.01); *G06N 3/045* (2023.01); *G06N 3/08* (2013.01); *G06V 10/806* (2022.01); *G06V 10/82* (2022.01); *G06V 20/58* (2022.01)

(58) Field of Classification Search
CPC ...... G06V 10/56; G06V 10/806; G06V 10/82; G06V 20/58; G06V 10/143; G06V 10/52;
(Continued)

(56) References Cited

U.S. PATENT DOCUMENTS

2017/0206405 A1\* 7/2017 Molchanov ............ G06N 3/044
2018/0285689 A1\* 10/2018 Mei ........................... G06T 7/90
(Continued)

OTHER PUBLICATIONS

Shopovska I, Jovanov L, Philips W. Deep visible and thermal image fusion for enhanced pedestrian visibility. Sensors. Aug. 28, 2019;19(17):3727. (Year: 2019).\*
(Continued)

*Primary Examiner* — Fayyaz Alam
(74) *Attorney, Agent, or Firm* — Leveque Intellectual Property Law, P.C.

(57) ABSTRACT

A computer-implemented method of detecting one or more objects in a driving environment located externally to a vehicle, and a vehicle imaging system configured to detect one or more objects. The computer-implemented method includes training a first neural network to detect objects in a color video stream, the first neural network having a plurality of mid-level color features at a plurality of scales, and training a second neural network, operatively coupled to color neural network and an infrared video stream, to match, at the plurality of scales, mid-level infrared features of the second neural network to mid-level color features of the first neural network. A pixel-level invisibility map is then generated from the color video stream and the infrared video stream by determining differences, at each of the plurality of scales, between mid-level color features at the first neural network and mid-level infrared features at the second infrared neural network, and coupling the result to a fusing function.

19 Claims, 11 Drawing Sheets
(6 of 11 Drawing Sheet(s) Filed in Color)

(51) Int. Cl.
  *G06N 3/08* (2023.01)
  *G06V 10/80* (2022.01)
  *G06V 10/82* (2022.01)
  *G06V 20/58* (2022.01)

(58) Field of Classification Search
  CPC .......... G06V 20/95; G06N 3/045; G06N 3/08; G06N 3/047; G06N 3/088
  See application file for complete search history.

(56) References Cited

U.S. PATENT DOCUMENTS

| | | | |
|---|---|---|---|
| 2020/0074239 A1* | 3/2020 | Park | G06F 18/217 |
| 2021/0019521 A1* | 1/2021 | Park | B63B 79/15 |
| 2021/0174669 A1* | 6/2021 | Guan | G06N 3/08 |
| 2023/0068036 A1* | 3/2023 | Park | G06N 3/09 |

OTHER PUBLICATIONS

Chen Z, Huang X. Pedestrian detection for autonomous vehicle using multi-spectral cameras. IEEE Transactions on Intelligent Vehicles. Mar. 20, 2019;4(2):211-9. (Year: 2019).*

* cited by examiner

Detected object(s) in color image

Detected object(s) in color image

Pixel Invisibility Maps of Color Images

Detected Objects in Paired IR Images

DETECTING OBJECTS NON-VISIBLE IN COLOR IMAGES

CROSS-REFERENCE TO RELATED APPLICATIONS

This application claims the benefit of U.S. Provisional Patent Application Ser. Nos. 63/119,196 (filed on Nov. 30, 2020) and 63/177,578 (filed on Apr. 21, 2021), which are each hereby incorporated by reference in their respective complete entireties.

TECHNICAL FIELD

One or more embodiments set forth, disclosed, and/or illustrated herein relate to a vehicle imaging system, and more particularly, to a vehicle imaging system configured to detect one or more objects.

BACKGROUND

Automated vehicles largely depend upon the use of sensors for safe navigation. A controller of an autonomous vehicle uses vehicle sensors, e.g., color cameras, to determine at least one obstacle-free region and create a path through that region to navigate. Poor weather conditions and low light levels (e.g., during night time) may limit the ability to detect obstacles by color cameras, resulting in a hazardous navigation condition for the vehicle.

SUMMARY

Given a color image, one or more embodiments of the present disclosure are configured to generate a pixel-level invisibility mask for a captured image without manual labelling. The invisibility mask generated in accordance with one or more embodiments distinguishes non-visible pixels from visible pixels. The one or more embodiments demonstrate the effectiveness of an object detection system for the infrared domain using the mid-level features transferred from its peer color images. The pixel-level invisibility mask can also be used as a confidence map to fuse the results from a plurality of sensors.

In safety critical applications like self-driving or autonomous vehicles, false negatives of object detection are a bottleneck of its deployment on perceptual tasks. Leaving objects of concern in an external roadway environment, such as, for example, pedestrians, animals, and other vehicles undetected could lead to potentially disastrous consequences. One or embodiments of the present disclosure are configured to detect non-visible objects in color images in the form of a pixel-level invisibility map and estimate the reliability of object detectors with respect to the sensor's limitation. Equipped with such an invisibility map, a vehicle object detection system could decide to trust the decisions made on sensor input or signal a warning message along with handover to a human. This is a huge step forward to ensure safety for perceptual systems based on color cameras. The visibility mask will be useful in sensor fusion as the confidence map, which will enhance the overall accuracy for object detection and tracking in autonomous vehicles, in accordance with one or more embodiments of the present disclosure. At certain cases, any system may also miss a false negative from object detectors.

One or more embodiments relate to a method and a system to determine regions that are unseeable/non-visible by color cameras to thereby prevent an occurrence of unsafe vehicle navigation due to an inability to detect one or more objects in a vehicle driving path.

In accordance with one or more embodiments, a method comprises one or more of the following: training a color neural network to detect objects in a color video stream, the color neural network having mid-level color features at a plurality of scales; freezing the color neural network, forming a trained color neural network; training an infrared neural network coupled to an infrared video stream to match mid-level infrared features of the infrared neural network to the mid-level color features of the trained color neural network coupled to the color video stream, at the plurality of scales; freezing the infrared neural network, forming a trained infrared neural network; and generating an invisibility map from the color video stream and the infrared video stream by determining differences, at each of the plurality of scales, between mid-level color features at the trained color neural network and mid-level infrared features at the trained infrared neural network, and coupling the result to a fusing function.

In accordance with one or more embodiments, the plurality of scales comprises three scales.

In accordance with one or more embodiments, the fusing function comprises an ensemble average.

In accordance with one or more embodiments, the color neural network and the infrared neural network respectively comprise deep neural networks.

In accordance with one or more embodiments, the deep neural networks comprise You Only Look Once, version 3 (YOLO-v3) networks.

In accordance with one or more embodiments, training the color neural network comprises a color video stream comprising images of the daytime, the training the infrared neural network includes an infrared video stream comprising images of the daytime, and the generating the invisibility map includes a color video stream and an infrared video stream comprising one or more images of at least one of dusk, dawn, nighttime and fog.

In accordance with one or more embodiments, the invisibility map predicts a likelihood of the presence of a non-visible object for every pixel in an image of the color video stream.

In accordance with one or more embodiments, the method further comprises aligning one or more image pairs, each image pair having an image from a raw color video stream and an image from a raw infrared video stream, to form the color video stream and the infrared video stream.

In accordance with one or more embodiments, aligning a plurality of image pairs comprises, at least in part, a Generative Adversarial Network (GAN).

In accordance with one or more embodiments, the GAN mitigates an image plane displacement.

In accordance with one or more embodiments, determining differences further includes determining at least one Euclidian distance between a mid-level feature at the trained color neural network and a mid-level feature at the trained infrared neural network.

In accordance with one or more embodiments, an imaging system comprises one or more of the following: a first trained neural network, operatively coupled to a color video stream and operable to detect objects in the color video stream, the first neural network having mid-level color features at a plurality of scales; a second trained neural network, operatively coupled to an infrared video stream and the first trained neural network, and operable to match, at the plurality of scales, mid-level infrared features of the second trained neural network to the mid-level color features of the first trained neural network coupled to the color video stream; and a computing device, operatively coupled to the first trained neural network and the second trained neural network, the computing device having one or more processors and a non-transitory memory, operatively coupled to the one or more processors, comprising a set of instructions executable by the one or more processors to cause the one or more processors to: generate a pixel-level invisibility map from the color video stream and the infrared video stream, by determining differences, at each scale in the plurality of scales, between mid-level color features at the first trained neural network and mid-level infrared features at the second trained neural network, and coupling the result to a fusing function.

In accordance with one or more embodiments, a computer-implemented method comprises one or more of the following: dynamically detecting a driving environment located externally to a vehicle; receiving image data of the detected external driving environment; dynamically conducting, via a first neural network, image analysis of the image data to detect objects in the detected external driving environment; generating, in response to the image analysis, paired images of color images and infrared images of the detected external driving environment; and generating, in response to the paired images, an invisibility map of the detected external driving environment of the vehicle.

DRAWINGS

The patent or application file contains at least one drawing executed in color. Copies of this patent or patent application publication with color drawing(s) will be provided by the Office upon request and payment of the necessary fee.

The various advantages of the embodiments of the present disclosure will become apparent to one skilled in the art by reading the following specification and appended claims, and by referencing the following drawings, in which:

Figure 10:
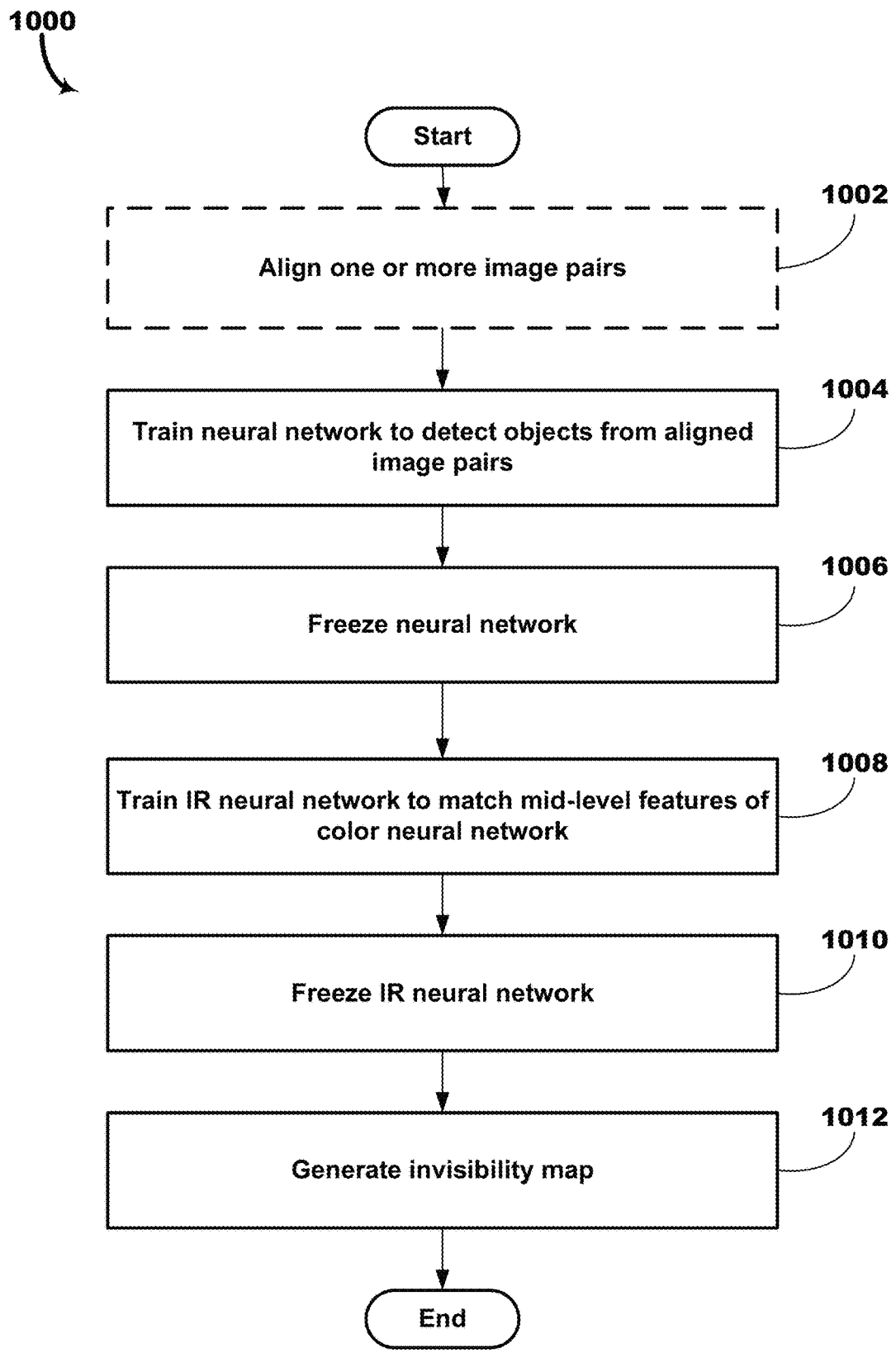
Figure 11:
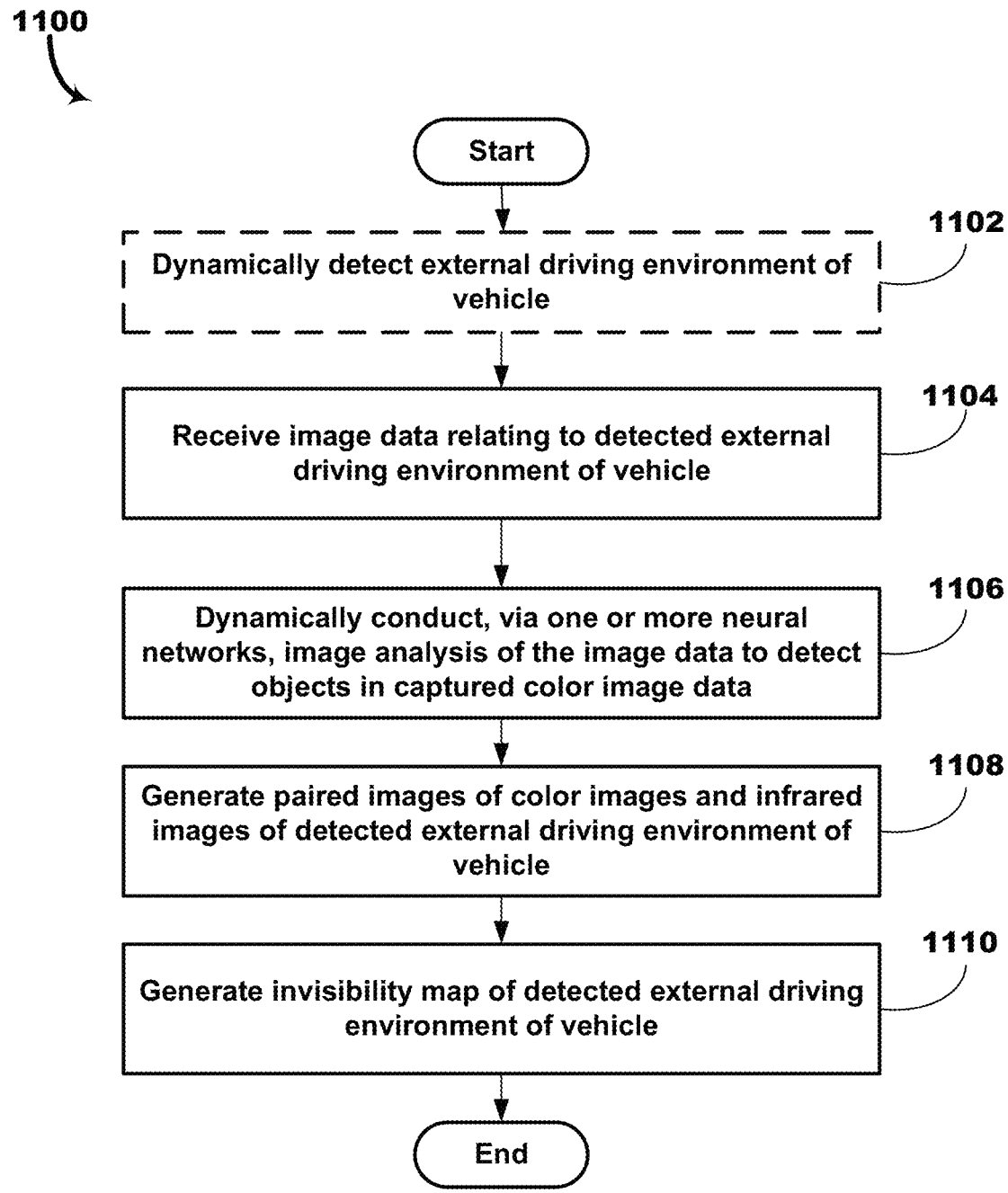
Figure 12:
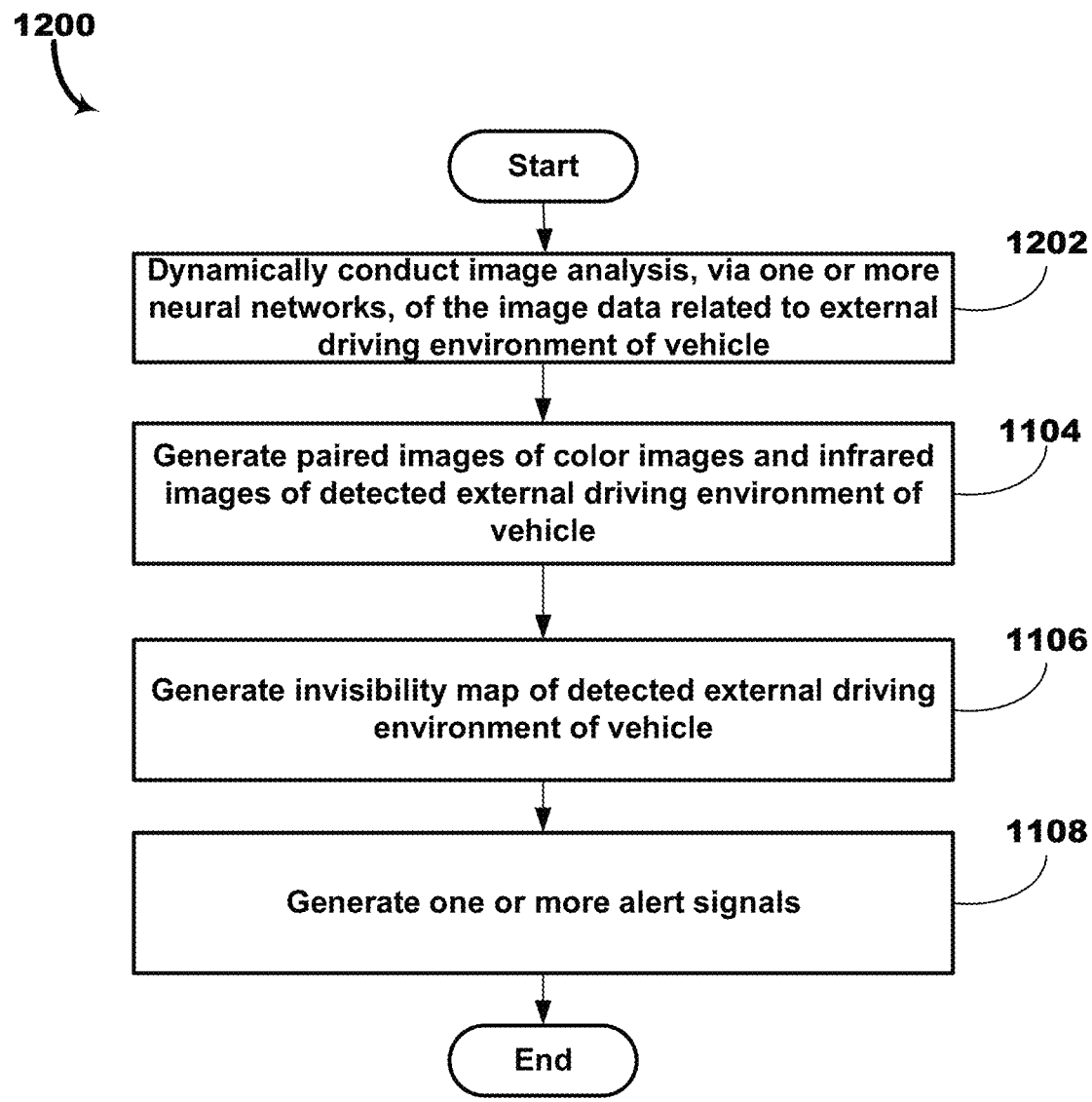

FIGS. 10 through 12 respectively illustrate a schematic diagram of an example computer-implemented method, in one or more embodiments shown and described herein.

DESCRIPTION

Figure 1A:
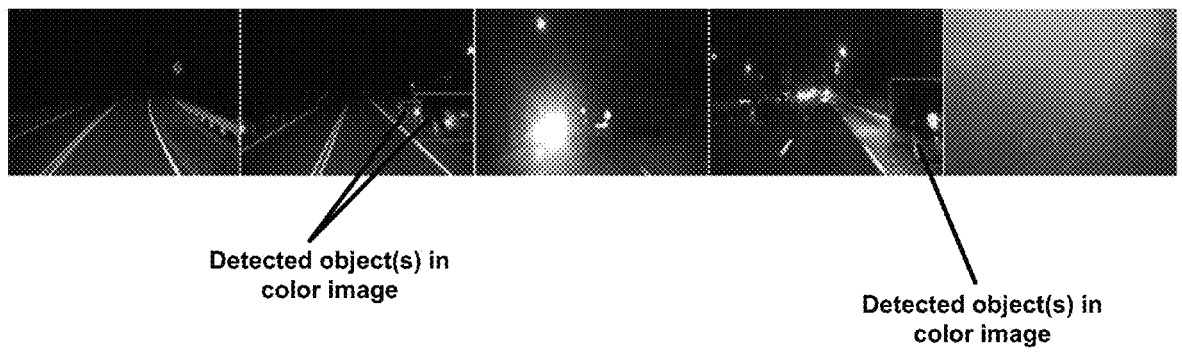
FIGS. 1A through 1C illustrate a prediction of an invisibility map, in accordance with one or more embodiments set forth, shown, and/or described herein.
Figure 1B:
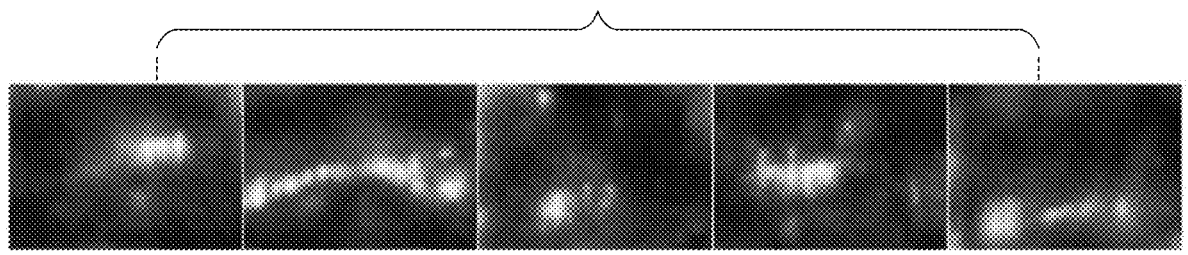
Figure 1C:
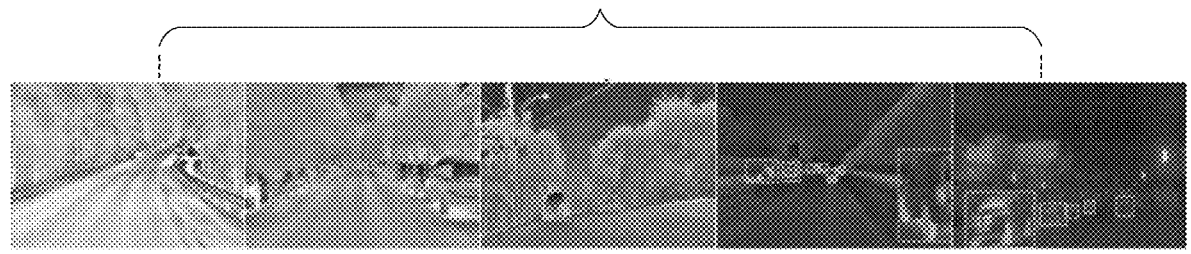

As illustrated in FIGS. 1A through 1C, an invisibility map is predicted for each pixel (FIG. 1B) given only a color image (FIG. 1A). The method and system in accordance with one or more embodiments is configured to detect distant objects, highly occluded and cluttered objects, objects having a strong glare, a plurality of objects from complex scenes (e.g., working zones on highway) and objects in poor visibility conditions (e.g., fog, precipitation, dust, smoke, etc.). Color detectors can only detect objects that are visible to its spectrum, while there are many more objects that may actually be in the scene (FIG. 1C). This could result in disastrous vehicle navigation consequences where safety is crucial should such missed detection be trusted or otherwise relied upon by the vehicle operator (whether autonomous, remote, or manually driven). The pixel-level invisibility map in accordance with one or more embodiments indicates how much the detection results from color images may be trusted or otherwise relied upon, both for false negatives and false positives.

Figure 2A:
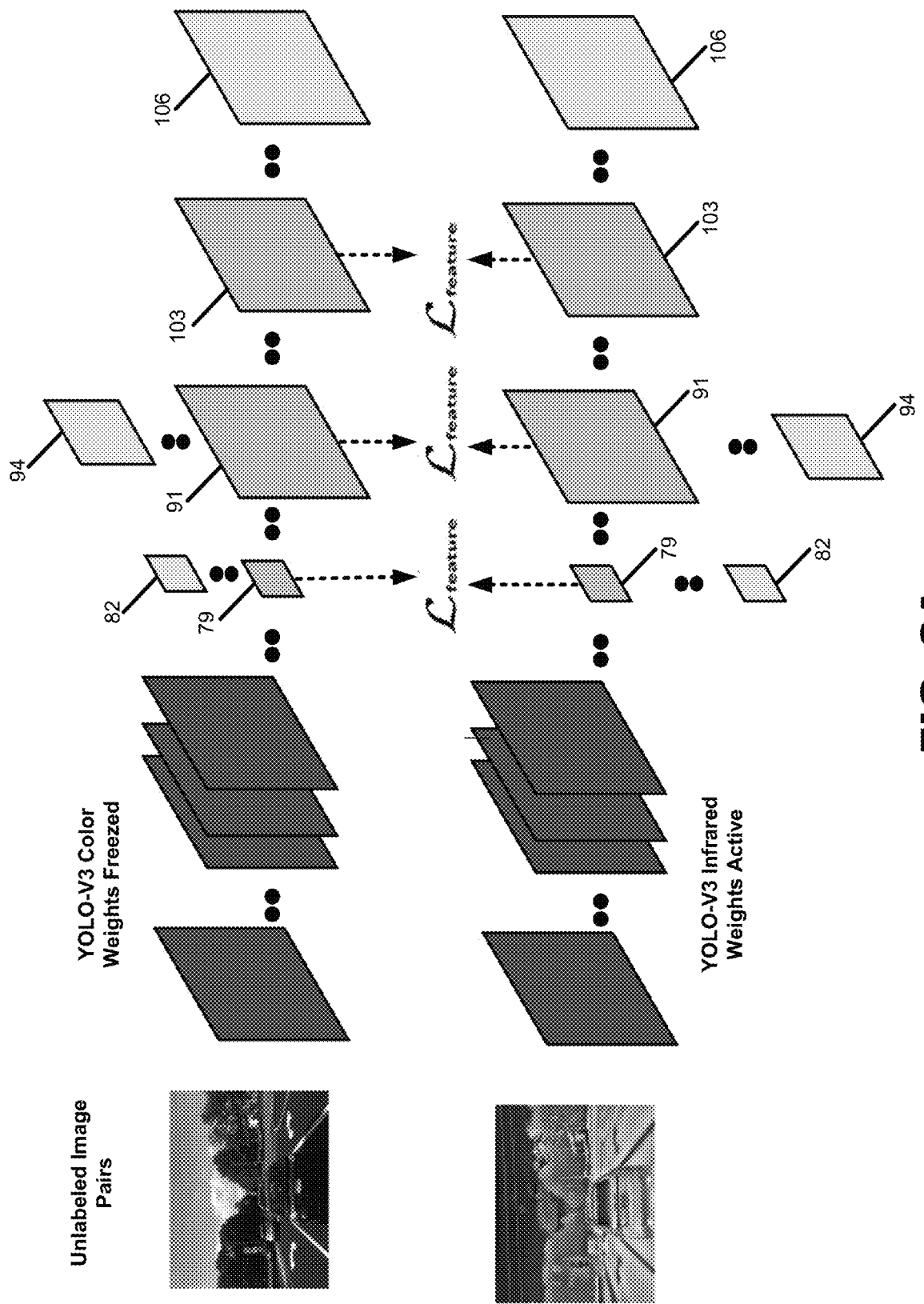
FIGS. 2A and 2B illustrate an overview of a machine learning subsystem of the vehicle imaging system, in accordance with one or more embodiments set forth, shown, and/or described herein.
Figure 2B:
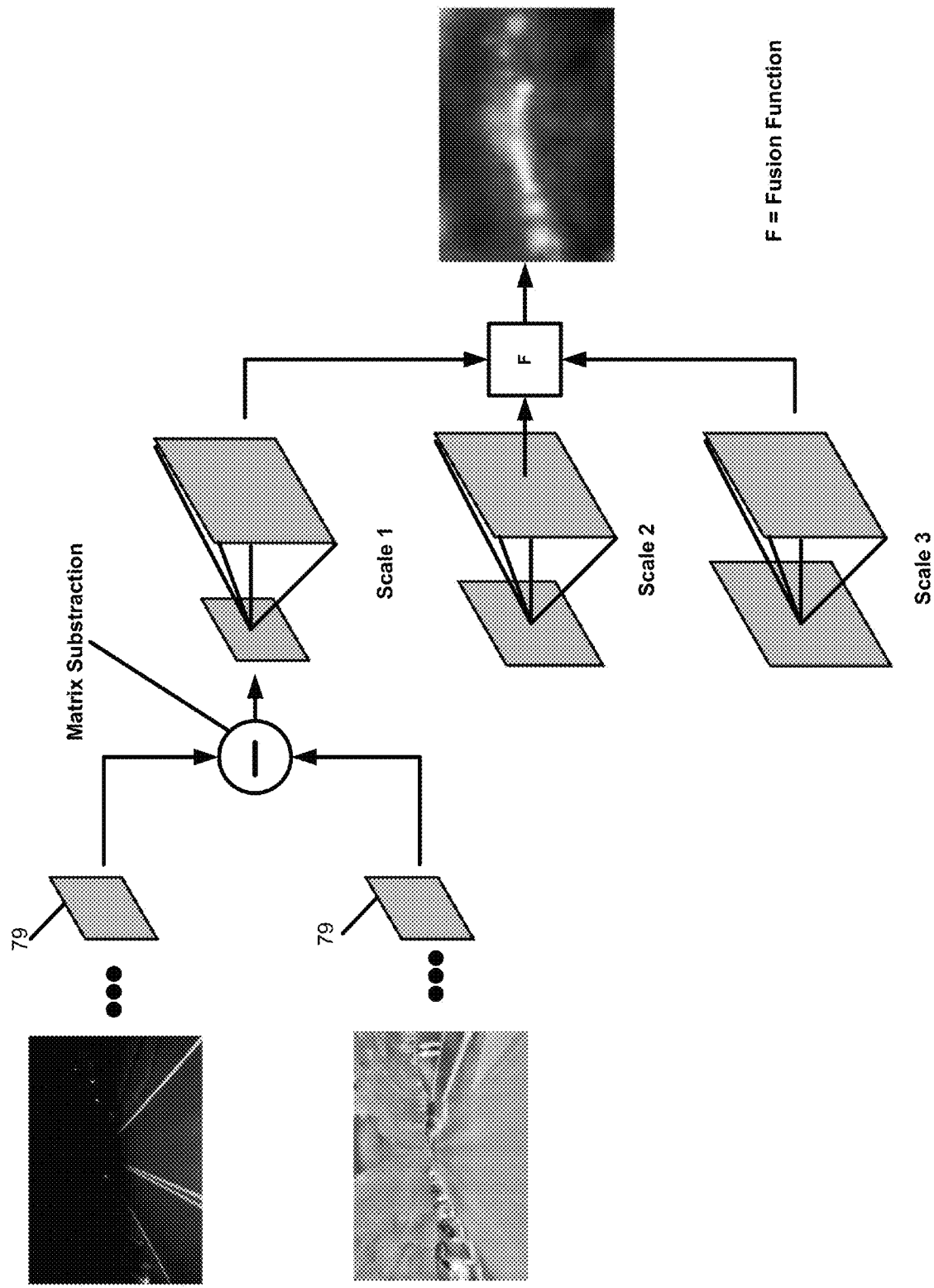

FIGS. 2A and 2B illustrate an overview of a vehicle imaging system, in accordance with one or more embodiments. The vehicle imaging system receives image data of well-aligned image pairs from an unlabeled video stream. By way of example, the general layers are in denoted in red, the mid-level detected layers 82, 94, and 106 are in denoted in yellow, the mid-level layers to transfer 79, 91, and 103 are in denoted in green, and the feature difference(s) are denoted in orange.

In the training stage illustrated in FIG. 2A, the YOLO-V3 color network is frozen, while YOLO-V3 infrared network is trained to reproduce the mid-level features as the ones in the YOLO-V3 color network at three scales, which are located at layers 79, 91, and 103 of the network. In the test stage illustrated in FIG. 2B, the difference of those features from layers 79, 91, and 103 are computed and fused to obtain a final invisibility mask.

Figure 3:
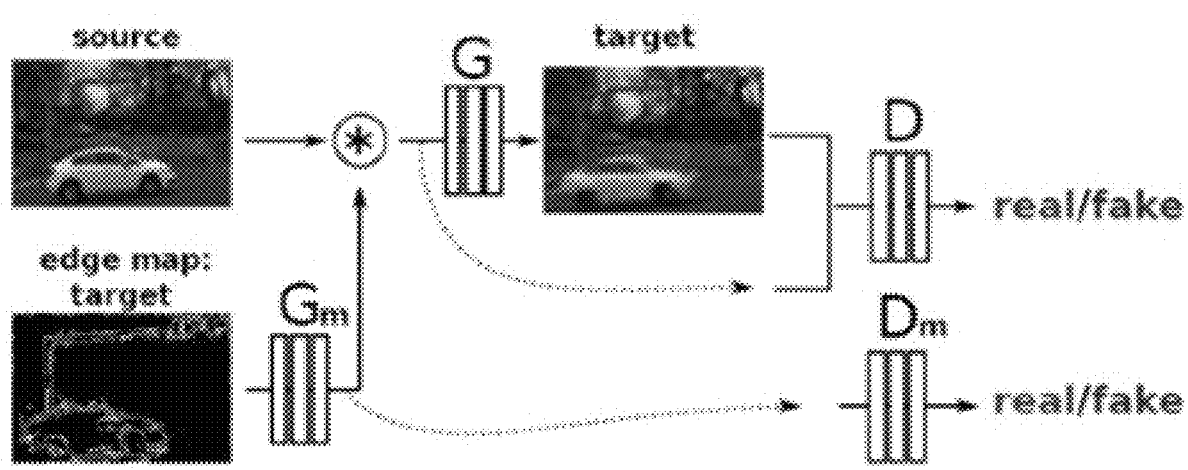
FIG. 3 illustrates a base alignment network, in accordance with one or more embodiments set forth, shown, and/or described herein.

FIG. 3 illustrates a base alignment network, in accordance with an embodiment of the present disclosure. The module takes as input source image data and an edge map from a detected target position, and outputs the target image in the detected target position. The conversion from source to target, which is performed using network G, is conditioned on the motion cues which are generated using network $G_m$. The target prediction after network G and motion cues generated by $G_m$ are fed into two discriminators D and $D_m$ respectively.

Figure 4:
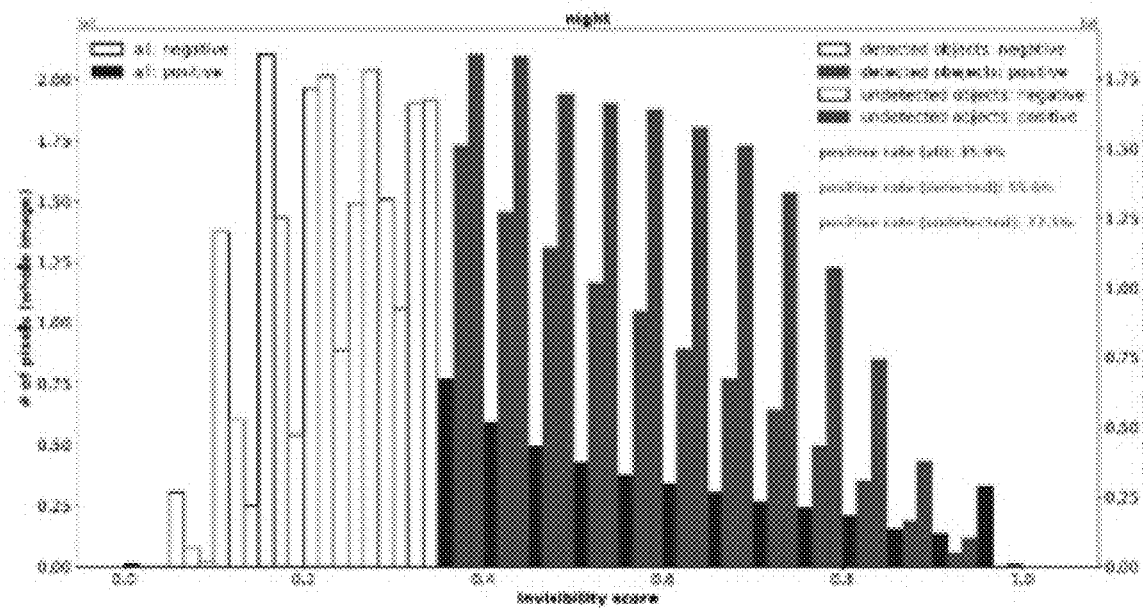
FIG. 4 illustrates a prediction of performance of an invisibility map, in accordance with one or more embodiments set forth, shown, and/or described herein.

FIG. 4 illustrates a prediction performance of a pixel-level invisibility map, in accordance with one or more embodiments of the present disclosure. The result of a pixel-level invisibility map on capturing the false negatives of Mask-CNN (Convolutional Neural Network) for night scenes as a histogram of distances is illustrated. With a threshold of 0.35 (separated by empty bars and solid bars) for an invisibility score, the invisibility map can cover approximately 77.5% of the pixels in the undetected objects (green bar) while only taking up approximately 35.9% of the pixels in the night images.

FIGS. 5A and 5B illustrate sample distance distributions between intermediate-level features from layers in YOLO-v3 and sample invisibility scores from different lighting conditions, in accordance with one or more embodiments.

The Gaussian distributions from left to right are respectively from data of daytime, dawn, dusk, and night conditions.

Figure 6:
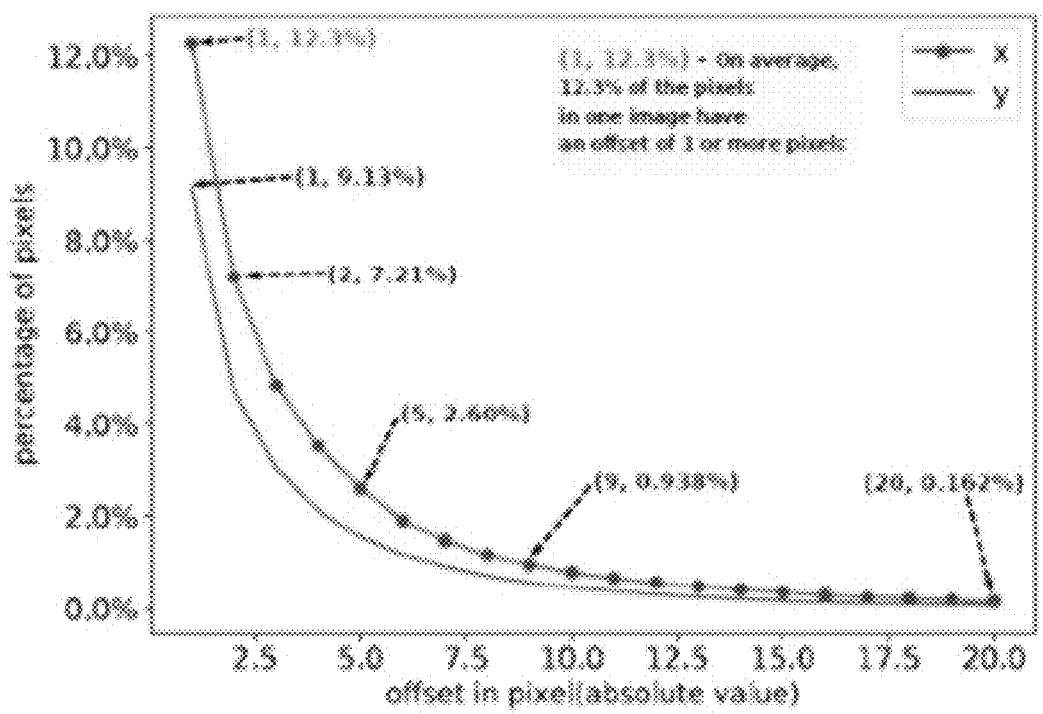
FIG. 6 illustrates a graph depicting X-Y offset distributions, in accordance with one or more embodiments set forth, shown, and/or described herein.

FIG. 6 illustrates a graph of depicting X-Y offset distributions, in accordance with one or more embodiments. An image plane offset in the x direction is on average larger than that in the y direction. Also, distinct movements (5 pixels or more) constitute approximately 2.6% of the pixels in the images.

Figure 7:
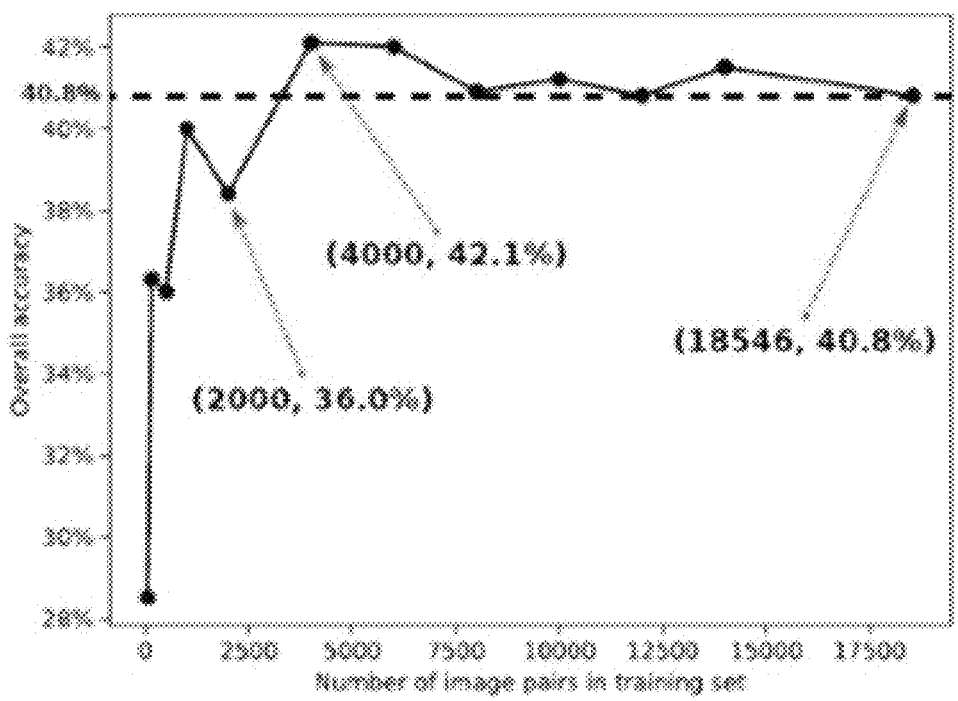
FIG. 7 illustrates a graph comparing data set sizes, in accordance with one or more embodiments set forth, shown, and/or described herein.

FIG. 7 illustrates a graph comparing data set sizes, in accordance with one or more embodiments. The size of training data sets for knowledge transfer was varied, and it was observed that using 4,000 image pairs can obtain the same if not better accuracy as the original size of 18,546 image pairs.

Object detection has rapidly enhanced since the emergence of large-scale data sets and powerful baseline systems like the one-stage detector YOLO ("You Only Look Once"). One issue of importance in deploying detectors in safety-critical applications such as self-driving or autonomous vehicles is the required high confidence ensuring that navigable regions are free of obstructing objects during operational weather and lighting conditions. Failing to detect objects (i.e., false negatives) or provide warning signals, for example, when crossing pedestrians or parking vehicles are left unnoticed by object detectors, carries potentially disastrous consequences. While the performance of object detectors is improving, they cannot be guaranteed never to make mistakes. Thus, in addition to delivering high detection accuracy, reliable vision systems should "know when they don't know." As illustrated in FIG. 1, this can be achieved by predicting a so-called pixel-level invisibility map for color images without the need for manual labeling, in accordance with one or more embodiments of the present disclosure. Equipped with such an invisibility map, the vehicle imaging system could decide to trust detection results of some regions over others in an image, signal warning messages, or even transfer vehicle control to a human.

An invisibility map for one image is defined as the likelihood that a region or pixel contains objects non-visible in that domain. That is, the likelihood of one pixel or region contributing to false negatives in object detectors. Regions of color images during good daylight obtain low invisibility scores because visible light of enough energy is reflected to the camera by objects on the spot. In contrast, dark regions of images at night or obscure regions of images in fog will have high invisibility scores. A method and apparatus to determine regions that are useable by color cameras is desired. One conventional approach to generate an invisibility map is to create a large labeled data set where every pixel in the image is labeled with an invisibility score, the data of which is often expensive and ambiguous to collect. Instead, embodiments of the present disclosure predict the invisibility score for every pixel in the image without laborious labeling efforts by a novel use of cross modal knowledge distillation and the generation of well-aligned image pairs between color and infrared images.

In accordance the present disclosure, the terms "invisibility map" and "invisibility mask" shall be considered to represent identical concepts and may be used interchangeably.

Cross-modal knowledge distillation, also called supervision transfer, is a means of avoiding labeling large-scale data sets for certain modalities. Given paired images from two modalities, intermediate-level representations are transferred from a richly annotated color domain to other modalities with limited labeled data sets, such as depth images, sound, and infrared images. A novel feature of one or more embodiments of the present disclosure is the utilization of the supervision transfer from color to infrared images of the daytime, and then using distances between mid-level representations of two modalities to approximate perceptual distances between invisibility of two modalities in various lighting conditions including dusk, dawn, dark nights, and fog.

Knowledge distillation specifically requires that the two modalities are presented in a paired fashion, especially in a well-aligned manner for object detection and also for the pixel-level invisibility map. Here, "well-aligned" image pairs are image pairs in which the corresponding pixels of the paired images are located at the same positions in their respective image planes. Raw, i.e., unaligned, image pairs captured by color and infrared sensors may have large displacements, which typically come from (1) internal camera attribute differences such as focal length, resolution and lens distortion, (2) external transformations like pose differences and (3) time differences from exposure time and shutter speed. In accordance with one or more embodiments of the present disclosure the first two disparities are addressed by image registration using a known pattern board, while the Alignment Generative Adversarial Network (AlignGAN) algorithm is employed to alleviate the remaining displacements.

Novel technical features of one or more embodiments of the present disclosure include: (1) the generation of a pixel-level invisibility map for color images without manual labeling, hence contributing towards resolution of the failure detection problem caused by sensory false negatives in autonomous driving; (2) the direct transfer of mid-level representations from the color image to the infrared image for high detection accuracy in infrared domain; and (3) mitigating misalignment problems present in color-infrared pairs via the AlignGAN algorithm.

In accordance with one or more embodiments of the present disclosure learn to generate pixel-level invisibility maps for color images in an unsupervised way. During the training phase, one or more embodiments of the present disclosure take weakly-aligned color-infrared image pairs of the same scene as input values. Such imperfectly aligned image pairs are first registered to remove the geometric differences and then aligned by the AlignGAN algorithm to remove the remaining displacements between two modalities as detailed below. After the image pairs are well-aligned, the Knowledge Transfer System transfers the learned representations from the color domain to infrared domain. Then at the test (operational) stage, the pairs of representations are compared to estimate the invisibility score of every pixel in the color image. As a side product, the learned representations of infrared images can be directly used to construct an object detector for infrared images without any manual labelling or retraining, as shown in FIG. 2.

AlignGAN: Given the raw image pairs which are poorly aligned, in accordance with one or more embodiments of the present disclosure, the internal and external transformations between two cameras are removed using standard camera calibration techniques, as described below. AlignGAN, based on the GAN, is used in accordance with one or more embodiments embodiments of the present disclosure to learn to generate the well-aligned color image from weakly-aligned color-infrared pairs. The basics of the algorithm are shown in FIG. 3. As the figure shows, two streams are used for learning—both using the alignment block—during one iteration of the training phase. The first stream uses a color image and an edge map from a weakly-aligned infrared image as the source and produces a color image as the target. In the other stream, the source image is still the color image; however, the edge map is from a close color image Ic1 in the video stream, and the target image is the color image Ic1 itself.

Knowledge Transfer from Color to Infrared Domains

In accordance with one or more embodiments of the present disclosure the YOLO-V3 architecture is used, for at least three reasons: (1) It is fast and deployable in real-time applications like self-driving or autonomous vehicles; (2) There is no need of a proposal network such as in the Faster RCNN and MASK-RCNN; and (3) It has three detection modules based on three different image scales with good detection capabilities for small objects that may appear on a road.

In accordance with one or more embodiments of the present disclosure the representations are transferred from the color domain to the infrared domain. The learned midlevel features of images are chosen to transfer in the YOLO-V3 architecture that occurs prior to the detection stage. This is referred to as the mid-only transfer. They are the outputs of layer 79, 91, and 103, respectively from three different scales, as illustrated in FIG. 2A. Two comparative experiments were conducted by transferring the last-layer detection results (YOLO-only) and both intermediate-level features and the detection results (Mid+YOLO). The detection results are computed based on the outputs of detection layers which are 82, 94, and 106.

An infrared detector was constructed without any manual labeling and fine-tuning, by concatenating learned intermediate features with the detection module from the color detector, which produces promising detection accuracy for infrared images in different lighting conditions.

Invisibility Estimation

Two detectors, $Yolo_c$ and $Yolo_i$, where $Yolo_c$ is pre-trained on richly-annotated data sets and $Yolo_i$ is trained using well-aligned image pairs, may be used to reproduce the same intermediate-level features as the ones of their peer color images. Based on the observation that mid-level features for infrared images are much less affected by the lighting conditions than the ones in color images, certain embodiments of the present disclosure use the mid-level feature differences between infrared and color images to estimate the lighting conditions and thereby estimated the visibility of every pixel in color images.

The YOLO-V3 architecture has a plurality, such as for example, three detection modules to estimate at three different scales, and consequently it provides intermediate-level features at three different scales. Embodiments, however, are not limited thereto, and thus, this disclosure contemplates other architectures providing differing numbers of scales. One or more embodiments of the present disclosure generate an invisibility score to integrate the feature differences at different scales as illustrated in FIG. 2B. Here, the invisibility score for a pixel $s_i$ is defined as a function F of the L2-distances (i.e., the Euclidian distances) of the mid-level features $\{d_k | k=1, 2, 3\}$ between color images and infrared images in Equation 1. Here, $d_1$, $d_2$, $d_3$ are from layers 79, 91, 103 respectively and $t_k$ is the highest value chosen for $d_k$. Finally, a convolutional neural network is trained based on U-Net to generate an invisibility map, even in the absence of infrared images.

$$F(d_1, d_2, d_3) = 1 - \frac{1}{3}\sum_{k=1}^{3} \min((t_k - d_k)/t_k, 0) \qquad \text{Eq. 1}$$

Experimental Setup

This section presents experimental outcomes for predicting undetectable areas in color images and the unsupervised knowledge transfer from color to infrared domain, in accordance with an embodiment of the present disclosure. A sensor module or platform was built that can be installed on the roof rack of any car (such a setup was used for experiments). A FLIR® Systems, Inc. Automotive Development Kit (ADK) camera and a ZED camera (Stereolabs, Inc.) was used as the sensor pair. The color-IR calibration was performed using Caltech calibration tools with a planar checkerboard partly made by aluminum foil. This removes major parts of camera distortion and helps establish a coarse estimation for common field of view and scale differences. With homographic warping based on pairs of corresponding points from two image planes, the disparity problem in the static scene can be addressed as well. Such weakly-aligned pairs of images are then taken as the input of AlignGAN, in accordance with an embodiment of the present disclosure.

Data Set: Color-IR Pair

Approximately 18,546 color-infrared pairs from the videos (around 120,000 image pairs) that were collected while driving in the day were sampled to construct the training set for transferring the intermediate-level features from the color domain to the infrared domain. For the validation data set, 2,000 image pairs with object bounding boxes were collected and manually labeled (500 image pairs during dawn, 500 image pairs during dusk, 500 image pairs during night, and 500 image pairs during fog conditions). They were used to evaluate the prediction performance of the undetectable area in color images and detection performance for infrared images. No exact statistics of the training set are available, as it was not manually labeled. A manually labeled validation set, however, which contained 7,821 vehicles, 1,138 traffic signs, 626 humans, and 343 trucks, may be indicative of the training data set.

Experiment Focus

The following questions are answered quantitatively in this section. (1) How effective (i.e., accurate) is the prediction of non-visible areas in color images? (2) How effective (i.e., accurate) is the detection performance on infrared images through knowledge transfer? (3) Which level of representation transfer will provide the best result on the detection accuracy? (4) Will AlignGAN enhance the knowledge transfer process? (5) How will the transfer performance change with respect to a plurality of images pairs?

How accurate is the prediction of the undetected area in the color image? Intermediate-level features from two paired deep neural networks (DNNs) were used as a space where Euclidean distance serves as the estimation of the reliability of color images compared to infrared images, in accordance with one or more embodiments of the present disclosure. The experimental results show that the one or more embodiments of the present disclosure produce accurate quality masks for invisibility. In the experiment, the values of $t_1$, $t_2$ and $t_3$ in Equation 1 were 4, 3.5, and 3.2, respectively.

Figure 5:
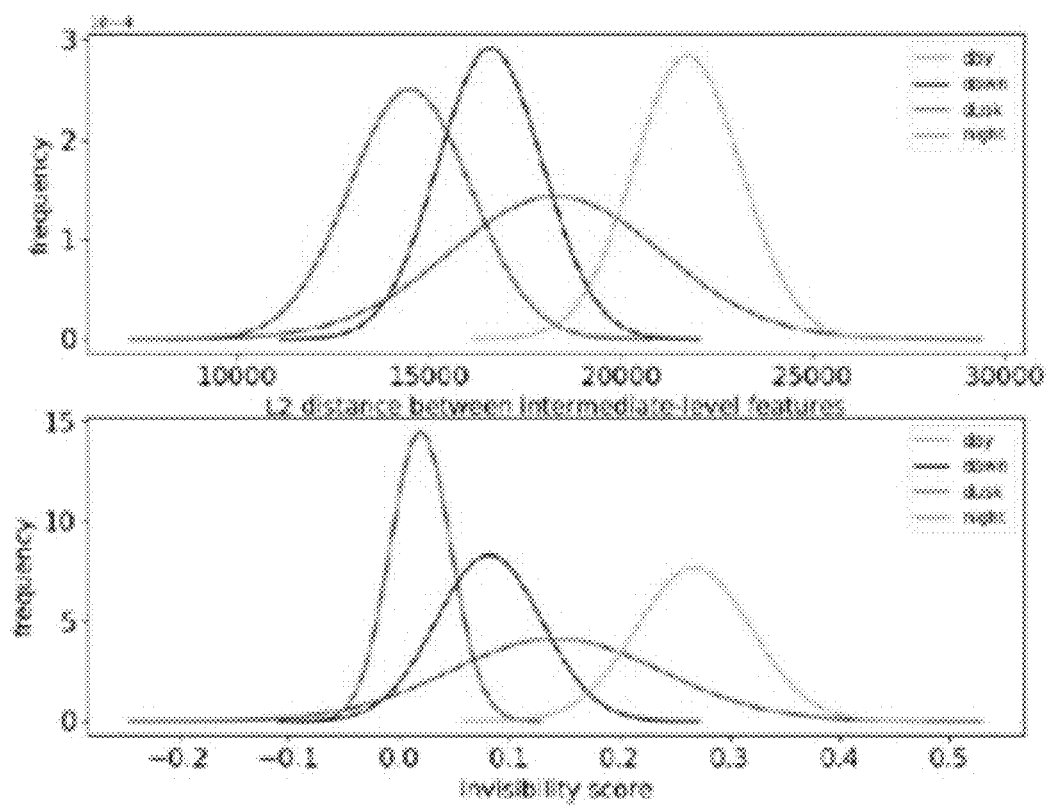
FIG. 5 illustrates sample Euclidian (L2) distance distributions between intermediate-level features from layers in YOLO-v3 and sample invisibility scores from different lighting conditions, in accordance with one or more embodiments set forth, shown, and/or described herein.

For image pairs respectively from day, dawn, dusk, and night, the L2 distance between their intermediate-level features and the invisibility score learned from the system were computed. As illustrated in the graph of FIG. 5, both the feature difference and invisibility score increase while the light intensity of the environment decreases. This is consistent with the observation that color images are more reliable in better lighting conditions. Such agreement is validated by the different reactions to light change inherited in different spectra used in color and infrared cameras, which will be explained in detail below. The Gaussian distribution of the invisibility score for day is (0.020, 0.028) and for night is (0.268, 0.052). These measures are highly separable with little overlap in the distributions, as illustrated in FIG. 5. These quantities show that the invisibility score can be used to estimate the per-pixel invisibility in the color images with different lighting conditions, in accordance with one or more embodiments of the present disclosure.

An effective binary visibility mask has the characteristics of covering: (1) most of the undetectable objects, and (2) only the undetectable area in an image. These characteristics in quantified form are used to assess the effectiveness of the experimental results. The visibility rate for a night scene is illustrated in the chart of FIG. 4.

The results of a quantitative analysis showing the effectiveness of predicting the undetectable area in the color images follows. In FIG. 4, there exist distinctions in the distribution of the undetectable areas and the entire image (mean of 0.61 vs 0.27), indicating that the score is a good representation of undetectability. The invisibility mask can cover approximately 77.5% of the undetectable area in the image with the visibility threshold of 0.35 and only report approximately 35.9% of the entire image. The invisibility mask for dawn time covers approximately 49.2% of the undetected area while reporting only 15.4% of the entire image. For dusk time, it covers approximately 73.4% of the undetected area while reporting approximately 22.2% of the entire image.

Can paired data facilitate detection using transfer learning? Firstly, the knowledge transfer through mid-level features can reach approximately 46.2% overall detection accuracy for infrared imagery in the Color-IR Pair data set. Since the learning doesn't require: (1) any manual annotations, and (2) any retraining, this is a promising result. This shows the importance of creating paired images for color images and infrared images. Other than color-depth, color-pose and image-sound pairs, the color-infrared pairs resemble each other in appearances and textures. This result can be used for object detection, segmentation for infrared images, and can provide an alternative to laborious manual labeling direct transfer of mid-level features from color to infrared imagery.

In accordance with one or more embodiments of the present disclosure, the effectiveness of the AlignGAN algorithm was evaluated using the post application of object detection. The detection performance of daytime data trained infrared detectors on nighttime data was tested/evaluated, which revealed that it can still obtain an overall accuracy of approximately 34.2%. The images used in the training phase were chosen from daytime with good lighting conditions, the test set including images taken during dawn, dusk, night, and fog conditions. Without any manually labelled training data, the detection Intersection over Union (IoU) of vehicles can reach approximately 50.6%, as shown in Table 1. This quantity shows that the intermediate-level features of infrared images can be transferred smoothly from day to night, in contrast to the ones in color images. The principle used in the invisibility score, in accordance with an embodiment of the present disclosure, is that features in IR are stable to light change and are trained to be like the ones in color, and the mid-level features produced by infrared images are of same the caliber of features in color images when lighting conditions are poor. This is a primary reason for success on estimating the invisibility of the color images using the invisibility scores as shown hereinabove.

Which layer is more effective? Experiments were performed that transferred the knowledge from different layers. Conventional belief is that combining mid-level features with last layer features will give the best detection results when retraining on the target data sets. However, the experiments show that using mid-level features only gives the best detection result of (approximately 40.8%) over mid-last layer transfer (approximately 36.1%) and the one using the YOLO-layer only gives (approximately 35.8%). These results are summarized in Table 2.

TABLE 1

| Name | Car | Person | Traffic Light | All |
|---|---|---|---|---|
| day | 0.620 | 0.191 | 0.576 | 0.462 |
| dusk | 0.610 | 0.186 | 0.485 | 0.424 |
| dawn | 0.600 | 0.337 | 0.476 | 0.471 |
| night | 0.506 | 0.120 | 0.399 | 0.342 |
| fog | 0.496 | 0.149 | 0.365 | 0.337 |

TABLE 2

| Name | Car | Person | Traffic Light | All |
|---|---|---|---|---|
| Mid-only | 0.513 | 0.241 | 0.470 | 0.408 |
| M + Y 0.05 | 0.470 | 0.178 | 0.516 | 0.388 |
| M + Y 0.1 | 0.474 | 0.171 | 0.500 | 0.382 |
| M + Y 1.0 | 0.437 | 0.170 | 0.475 | 0.361 |
| Yolo-only | 0.447 | 0.164 | 0.463 | 0.358 |

TABLE 3

| Name | Car | Person | Traffic Light | All |
|---|---|---|---|---|
| Mid + Yolo 1.0 | 0.437 | 0.170 | 0.475 | 0.361 |
| Mid + Yolo 1.0 + Flow Encoder | 0.442 | 0.191 | 0.481 | 0.371 |

More importantly, the weight of the YOLO layer was varied to 0.05 and 0.1 in the loss function and two more experiments were conducted. Surprisingly, it was found that higher weights on the YOLO layer resulted in worse overall detection accuracies. One potential explanation for this observation is that the data set is not large enough to train a new object detector for all modules, especially for the class prediction and bounding box regression. Consequently, and in accordance with one or more embodiments of the present disclosure, it is more efficient to learn only the mid-level features and to not change layers of the detection module.

How much will the AlignGAN algorithm help the detection? Even after the pre-processing, the image pairs still have some displacements. Here, the statistics of such displacements are calculated. With an image resolution of 640×512, the estimated X-Y displacement is illustrated in FIG. 6. On average, there are only about 2.6% pixels in one image with five or more displacement on the X-direction, which is considered to be the threshold of movement that affect the detection results. Also, more displacements in the X-direction than in the Y-direction of the image plane were noticed. This is attributed to the fact that object movements projected to the image plane are more obvious in the x-direction than in the y-direction.

The degree to which AlignGAN can enhance the data transfer from color domain to infrared domain was evaluated, in accordance with certain embodiments of the present disclosure. Results of an alignment module based on the Pix2pix network and FlowNet 2, and the AlignGAN module are shown in Table 3; there is an enhancement of approximately 2.77% with the AlignGAN module.

It was shown that mid-level feature transfer results in the best performance. The plurality of image pairs required to achieve that performance is now determined.

The graph of FIG. 7 shows that 4,000 randomly sampled image pairs from the space of 18,546 image pairs can achieve the same if not better accuracy than the entire sample space. This observation implies that the domain difference from color to infrared can be learned from a small amount of image pairs and that the transfer discriminating visual representations from the well-established color detection task to infrared images can be done in a light-weighted manner. FIG. 7 shows experiments with different numbers of images (from 100 to 18,000) and that the performance will be stable after 4,000 images. Such a result may appear to be counter-intuitive at first sight as more data often leads to better results when modal capacity is large enough like the one used in the experiment. One potential explanation for the saturation point is that the two domains have much in common and thus the domain difference can be mitigated with a few examples. This saturation point observation with 4,000 samples can be used as a promising deployment strategy of direct knowledge transfer, in accordance with an embodiment of the present disclosure. Consequently, less time is needed to train for both the invisibility system and the direct knowledge transfer for object detection.

Figure 8:
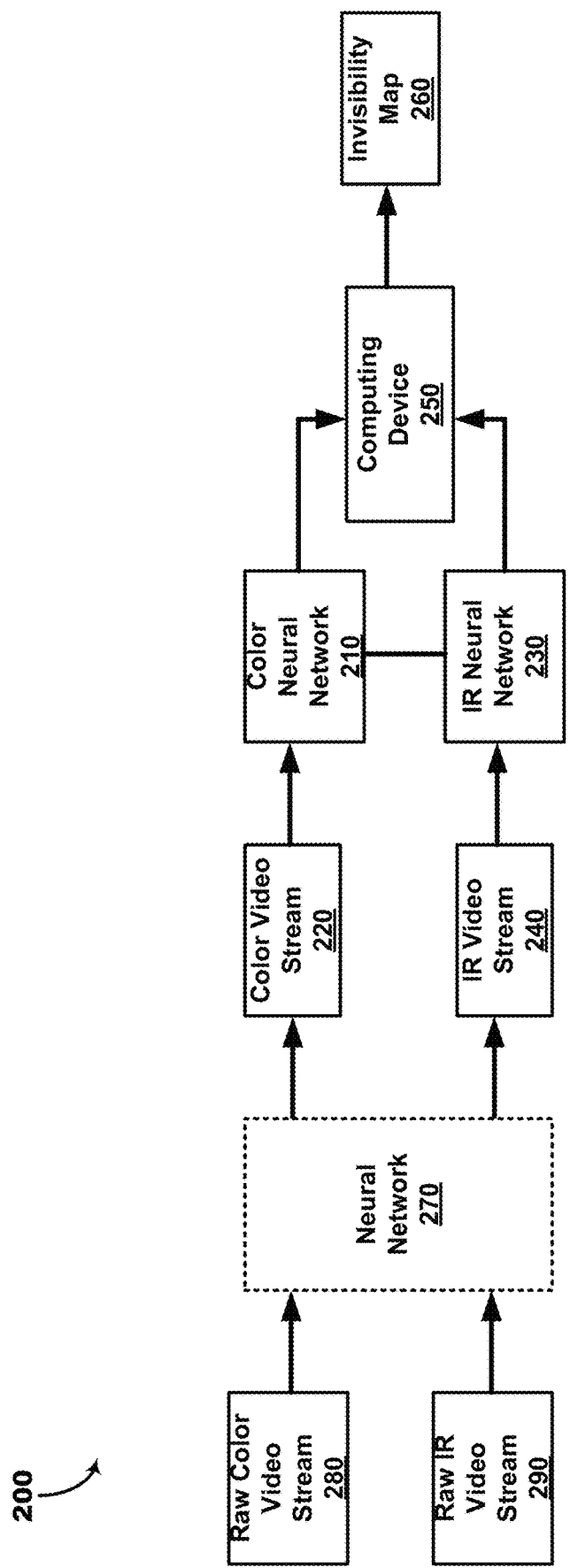
FIG. 8 illustrates a vehicle imaging system, in accordance with one or more embodiments set forth, shown, and/or described herein.

FIG. 8 depicts a vehicle imaging system 200 configured to generate an invisibility map based on captured image data relating to an external driving environment of a vehicle, in accordance with one or more embodiments set forth, shown, and/or described herein. The vehicle imaging system 200 comprises a first neural network, i.e., a color neural network 210 which is configured to receive a color video stream 220 related to the captured image data, as discussed herein with regards to the YOLO-V3 color network and FIG. 2. A second neural network, i.e., infrared (IR) neural network 330 is operatively coupled to the color neural network 210, and is configured to receive an infrared video stream 240 related to the captured image data, as discussed herein with regards to the YOLO-V3 infrared network and FIG. 2.

Figure 9:
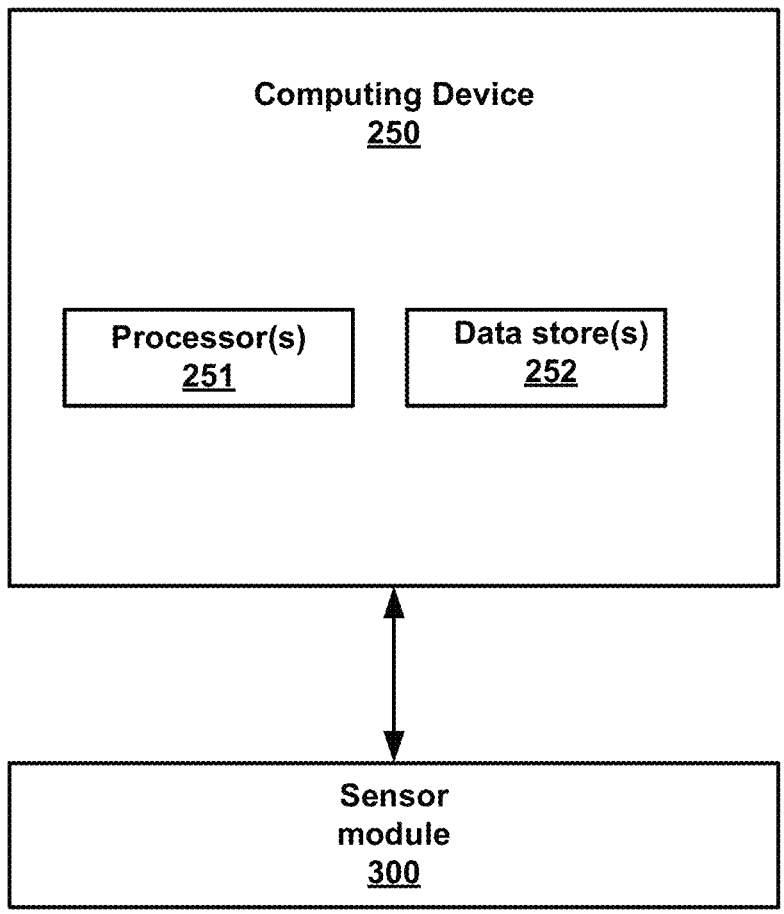
FIG. 9 illustrates a block diagram of an example subsystem for the vehicle imaging system of FIG. 8.

A computing device 250 is operatively coupled to the color neural network 210 and the infrared neural network 230 to generate one or more output signals comprising an invisibility map 260 as discussed herein with regards to FIG. 2. As illustrated in FIG. 9, the computing device 250 comprises one or more processors 251 and one or more data stores 252.

As set forth, described, and/or illustrated herein, "processor" means any component or group of components that are configured to execute any of the processes described herein or any form of instructions to carry out such processes or cause such processes to be performed. The one or more processors may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors may comprise at least one hardware circuit (e.g., an integrated circuit) configured to carry out instructions contained in program code. In embodiments in which there is a plurality of processors 251, such processors may work independently from each other, or one or more processors may work in combination with each other. In one or more embodiments, the one or more processors may be a host, main, or primary processor of a vehicle.

The one or more data stores 252 are configured to store one or more types of data. The vehicle may include interfaces that enable one or more systems or subsystems thereof to manage, retrieve, modify, add, or delete, the data stored in the data stores 252. The one or more data stores 252 may comprise volatile and/or non-volatile memory. Examples of suitable data stores 252 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 252 may be a component of the processors 251, or alternatively, may be operatively coupled to the processors 251 for use thereby. As set forth, described, and/or illustrated herein, "operatively coupled" may include direct or indirect connections, including connections without direct physical contact.

The vehicle imaging system 200 may be operatively connected to a sensor module 300, comprising one or more sensors configured to detect, capture, determine, assess, monitor, measure, quantify, and/or sense an external driving environment of a vehicle. As set forth, described, and/or illustrated herein, "sensor" means any device, component, system, and/or subsystem that can perform one or more of detecting, determining, assessing, monitoring, measuring, quantifying, and sensing something. The one or more sensors may be configured to detect, determine, assess, monitor, measure, quantify and/or sense in real-time. As set forth, described, and/or illustrated herein, "real-time" means a level of processing responsiveness that a user, system, or subsystem senses as sufficiently immediate for a particular process or determination to be made, or that enables the processor to keep up with some external process.

The sensor module 300 may comprise one or more optical sensors such as, for example, a color camera and an infrared camera. Embodiments are not limited thereto, and thus, this disclosure contemplates the one or more optical sensors comprising any suitable sensor architecture that permits practice of the one or more embodiments.

The color neural network 210 is trained to detect one or more objects in the color video stream 220. Upon completion of a training sequence or module, the color neural network 210 is frozen, i.e., its weights are fixed.

The infrared neural network 230 is trained using infrared video stream 240 to match mid-level features of its network to the corresponding mid-level features of the color neural network 210, particularly when the color neural network 210 is operatively coupled to color video stream 220 paired to the infrared video stream 240. Upon completion of a training sequence or module, the infrared neural network 230 is frozen, i.e., its weights are fixed. Both the color neural network 210 and the infrared neural network 230 comprise deep neural networks, e.g., convolutional neural networks or YOLO-v3 networks, and have mid-level features of their networks at a plurality (e.g., three) scales.

The one or more processors 251 are configured to generate a pixel-level invisibility map 260 by determining differences at each of the plurality of scales available at the color neural network 210 and the infrared neural network 230, between mid-level color features at the color neural network 210 coupled to the color video stream 220 and mid-level infrared features at the infrared neural network 230 coupled to the infrared video stream 240, when the color video stream 220 and the infrared video stream 240 are paired (i.e., viewing the same scene), and coupling the result to a fusing function. This is discussed herein with regards to FIG. 2. The one or more processors 251 may comprise a neural network, e.g., a convolutional neural network, a microprocessor, a graphics processor, etc.

Alternatively, a third neural network 270 may be provided to receive a raw (i.e., unaligned) color video stream 280 and a raw (i.e., unaligned) infrared video stream 290, and aligns one or more image pairs, an image pair having an image from the raw color video stream 280 and an image from the raw infrared video stream 290, to thereby form the color video stream 220 and the infrared video stream 240. The third neural network 970 may comprise a GAN.

In the illustrated examples of FIGS. 10 to 12, a flowchart of computer-implemented methods 1000, 1100, and 1200 for detecting objects by a vehicle. In one or more example embodiments, the respective flowcharts of the methods 1000, 1100, and 1200 may be implemented by the one or processors 251 of the computing device 250. In particular, the methods 1000, 1100, and 1200 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In one or more examples, software executed by the computing device 250 provides functionality described or illustrated herein. In particular, software executed by the one or processors 251 is configured to perform one or more processing blocks of the methods 1000, 1100, and 1200 set forth, described, and/or illustrated herein, or provides functionality set forth, described, and/or illustrated.

In the illustrated example computer-implemented method 1000 of FIG. 10, process block 1002 includes aligning one or more image pairs from captured image data relating to an external driving environment of a vehicle. The image pair includes an image from a raw (i.e., unaligned) color video stream and an image from a raw (i.e., unaligned) infrared video stream, to form a color video stream and an infrared video stream. This is discussed herein with regards to the AlignGAN algorithm.

The computer-implemented method 1000 may then proceed to illustrated process block 1004, which includes training a color neural network to detect objects in a color video stream, as discussed herein with regards to the YOLO-V3 color network. The color neural network comprises a deep neural network, e.g., a convolutional neural network or a YOLO-v3 network, and has mid-level features of its network at a plurality (e.g., three) scales.

The computer-implemented method 1000 may then proceed to illustrated process block 1006, which includes freezing the color neural network. Training is completed, and thus, the weights of the color neural network are frozen (fixed) at their final values.

The computer-implemented method 1000 may then proceed to illustrated process block 1008, which includes training an infrared neural network from an infrared video stream to match mid-level features of its network to the corresponding mid-level features of the color neural network. The infrared neural network is discussed herein with regards to the YOLO-V3 infrared network. The infrared neural network comprises a deep neural network, e.g., a convolutional neural network or a YOLO-v3 network, and has mid-level features of its network at a plurality (e.g., three) scales.

The computer-implemented method 1000 may then proceed to illustrated process block 1010, which includes freezing the infrared neural network. Training is completed, so the weights of the infrared neural network are frozen (fixed) at their final values.

The computer-implemented method 1000 may then proceed to illustrated process block 1012, which includes generating a pixel-level invisibility map by determining differences, at each of the plurality of scales available at the trained color neural network and the trained infrared neural network, between mid-level color features at the trained color neural network and mid-level infrared features at the trained infrared neural network, and then coupling the result to a fusing function. This is discussed herein with regards to FIG. 2. The computer-implemented method 1000 can terminate or end after execution of illustrated process block 1012.

In the illustrated example computer-implemented method 1100 of FIG. 11, process block 1102 includes dynamically detect a driving environment located externally to a vehicle.

The computer-implemented method 1100 may then proceed to illustrated process block 1104, which includes receiving image data of the detected external driving environment. The image data comprises image date related to a raw (i.e., unaligned) color video stream and image data related to a raw (i.e., unaligned) infrared video stream.

The computer-implemented method 1100 may then proceed to illustrated process block 1106, which includes dynamically conducting, via one or more neural networks, image analysis of the image data to detect objects in the detected external driving environment.

The computer-implemented method 1100 may then proceed to illustrated process block 1108, which includes generating, in response to the image analysis, paired images of color images and infrared images of the detected external driving environment.

The computer-implemented method 1100 may then proceed to illustrated process block 1110, which includes generating, in response to the paired images, a pixel-level invisibility map of the detected external driving environment of the vehicle. The pixel-level invisibility map predicts a likelihood of the presence of a non-visible object for every pixel in the captured image data of the color video stream. The computer-implemented method 1100 can terminate or end after execution of illustrated process block 1110.

In the illustrated example computer-implemented method 1200 of FIG. 12, process block 1202 includes dynamically conducting, via one or more neural networks, image analysis of image data to detect objects in a detected external driving environment of a vehicle.

The computer-implemented method 1200 may then proceed to illustrated process block 1204, which includes generating, in response to the image analysis, paired images of color images and infrared images of the detected external driving environment.

The computer-implemented method 1200 may then proceed to illustrated process block 1206, which includes generating, in response to the paired images, a pixel-level invisibility map of the detected external driving environment of the vehicle. The pixel-level invisibility map predicts a likelihood of the presence of a non-visible object for every pixel in the captured image data of the color video stream.

The computer-implemented method 1200 may then proceed to illustrated process block 1208, which includes automatically generating, in response to generating the pixel-level invisibility map, one or more alert signals of the presence of one or more detected objects in the detected external driving environment. The alert signals may comprise one or more of a visual warning signal, an audio warning signal, and a haptic warning signal. The duration of the automatic alert may be a period until the vehicle has passed the one or more detected objects. The computer-implemented method 1200 can terminate or end after execution of illustrated process block 1206.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "or" as used herein is to be interpreted as an inclusive or meaning any one or any combination. Therefore, "A, B, or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner. Moreover, it is understood that the terms "top," "bottom," "up," "down," "above," "below," and the like, are words of convenience and are not to be construed as limiting terms. The terms apparatus, device, system, etc. may be used interchangeably in this text.

Those skilled in the art will appreciate from the foregoing description that the broad techniques of the embodiments of the present disclosure may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A computer-implemented method, comprising:
   training a first neural network to detect objects in a color video stream, the first neural network having a plurality of mid-level color features at a plurality of scales;
   training a second neural network, operatively coupled to color neural network and an infrared video stream, to match, at the plurality of scales, mid-level infrared features of the second neural network to mid-level color features of the first neural network; and
   generating a pixel-level invisibility map from the color video stream and the infrared video stream by determining differences, at each of the plurality of scales, between mid-level color features at the first neural network and mid-level infrared features at the second infrared neural network, and coupling the result to a fusing function.

2. The computer-implemented method of claim 1, wherein:
   the first neural network comprises a deep neural network, and
   the second neural network comprises a deep neural network.

3. The computer-implemented method of claim 2, wherein each deep neural network comprises a You Only Look Once, version 3 (YOLO-v3) network.

4. The computer-implemented method of claim 1, wherein the invisibility map predicts a likelihood of a presence of one or more non-visible objects for every pixel in an image of the color video stream.

5. The computer-implemented method of claim 1, further comprising aligning one or more image pairs, each image pair comprising an image from a raw color video stream and an image from a raw infrared video stream, to form the color video stream and the infrared video stream.

6. The computer-implemented method of claim 1, wherein determining differences further comprises determining at least one Euclidian distance between the mid-level color features at the first neural network and the mid-level infrared features at the second neural network.

7. A vehicle imaging system, comprising:
a first trained neural network, operatively coupled to a color video stream and operable to detect objects in the color video stream, the first neural network having mid-level color features at a plurality of scales;
a second trained neural network, operatively coupled to an infrared video stream and the first trained neural network, and operable to match, at the plurality of scales, mid-level infrared features of the second trained neural network to the mid-level color features of the first trained neural network coupled to the color video stream; and
a computing device, operatively coupled to the first trained neural network and the second trained neural network, the computing device having one or more processors and a non-transitory memory, operatively coupled to the one or more processors, comprising a set of instructions executable by the one or more processors to cause the one or more processors to:
generate a pixel-level invisibility map from the color video stream and the infrared video stream, by determining differences, at each scale in the plurality of scales, between the mid-level color features at the first trained neural network and the mid-level infrared features at the second trained neural network, and coupling the result to a fusing function.

8. The vehicle imaging system of claim 7, wherein:
the first neural network comprises a deep neural network, and
the second neural network comprises a deep neural network.

9. The vehicle imaging system of claim 8, wherein each deep neural network comprises a You Only Look Once, version 3 (YOLO-v3) network.

10. The vehicle imaging system of claim 7, wherein the invisibility map predicts a likelihood of a presence of one or more non-visible objects for every pixel in an image of the color video stream.

11. The vehicle imaging system of claim 7, wherein the one or more processors are to execute the set of instructions to align one or more image pairs, each image pair comprising an image from a raw color video stream and an image from a raw infrared video stream, to form the color video stream and the infrared video stream.

12. The vehicle imaging system of claim 7, wherein determining differences further comprises determining at least one Euclidian distance between the mid-level color features at the first neural network and the mid-level infrared features at the second neural network.

13. A computer-implemented method, comprising:
dynamically detecting a driving environment located externally to a vehicle;
receiving image data of the detected external driving environment;
dynamically conducting, via a first neural network, image analysis of the image data to detect objects in the detected external driving environment, the first neural network having a plurality of mid-level color features at a plurality of scales;
generating by a second neural network, in response to the image analysis, paired images of color images and infrared images of the detected external driving environment, the second neural network configured to match, at the plurality of scales, mid-level infrared features of the second neural network to mid-level color features of the first neural network; and
generating, in response to the paired images, an invisibility map of the detected external driving environment of the vehicle.

14. The computer-implemented method of claim 13, wherein the image data comprises image date related to a raw color video stream.

15. The computer-implemented method of claim 14, wherein the image data comprises image date related to a raw infrared video stream.

16. The computer-implemented method of claim 15, further comprising aligning one or more image pairs, each image pair comprising an image from the raw color video stream and an image from the raw infrared video stream, to form the color video stream and the infrared video stream.

17. The computer-implemented method of claim 13, wherein the invisibility map comprises a pixel-level invisibility map to predict a likelihood of a presence of one or more non-visible objects for every pixel in an image of the color video stream.

18. The computer-implemented method of claim 13, further comprising, in response to generating the invisibility map, automatically generating one or more alert signals of a presence of one or more detected objects in the detected external driving environment.

19. The computer-implemented method of claim 13, wherein generating the invisibility map comprises determining differences, at each scale in the plurality of scales, between the mid-level color features at the first trained neural network and the mid-level infrared features at the second trained neural network, and coupling the result to a fusing function.

* * * * *